United States Patent [19]

Ronco et al.

[11] Patent Number: 4,925,926
[45] Date of Patent: May 15, 1990

[54] PREPARATION OF CATIONIC AZO OR HYDRAZONE DYES IN WHICH THE ALKYLATION AND THE SEPARATION OF THE CATIONIC DYE ARE CARRIED OUT CONTINUOUSLY

[75] Inventors: Roland Ronco, Pfeffingen; Ermanno Ciapponi, Eiken, both of Switzerland; Pierre Pessonneaux, Lyons, France

[73] Assignee: Ciba-Geigy Corporation, Ardsley, N.Y.

[21] Appl. No.: 129,575

[22] Filed: Dec. 7, 1987

[30] Foreign Application Priority Data

Dec. 15, 1986 [CH] Switzerland .......................... 4986/86

[51] Int. Cl.$^5$ ...................... C09B 43/00; C09B 44/10; C09B 67/34; C09B 69/02
[52] U.S. Cl. ..................................... 534/589; 534/579; 534/607; 534/611; 548/477; 564/251
[58] Field of Search ............... 534/589, 607, 611, 579; 564/251; 548/477

[56]  References Cited

U.S. PATENT DOCUMENTS

| | | | |
|---|---|---|---|
| 4,376,728 | 3/1983 | Raue et al. | 534/589 X |
| 4,392,998 | 7/1983 | Kühlthau | 534/589 X |
| 4,638,053 | 1/1987 | Neeb et al. | 534/589 |

FOREIGN PATENT DOCUMENTS

| | | | |
|---|---|---|---|
| 0019577 | 11/1980 | European Pat. Off. | 534/589 |
| 2631030 | 1/1978 | Fed. Rep. of Germany | 534/589 |

Primary Examiner—Floyd D. Higel
Attorney, Agent, or Firm—Kevin T. Mansfield

[57] ABSTRACT

The invention relates to a continuous process for the preparation of cationic azo or hydrazone dyes from heterocyclic diazo components and coupling components. The diazo component is diazotised in water and an acid, the diazo solution is coupled with the coupling component and continuously alkylated, preferably using sufficient acid that, after the alkylation, a two-phase system forms, consisting of an aqueous solution which is substantially free from dye and a highly concentrated oil phase or solid dye.

20 Claims, No Drawings

PREPARATION OF CATIONIC AZO OR HYDRAZONE DYES IN WHICH THE ALKYLATION AND THE SEPARATION OF THE CATIONIC DYE ARE CARRIED OUT CONTINUOUSLY

The present invention relates to a process for the preparation of cationic azo or hydrazone dyes and to the use thereof for dyeing acid-modified synthetic fibres.

It is known to precipitate cationic azo dyes by addition of electrolytes in the form of viscous oils or of crystalline dye salts from the aqueous solutions obtained after their synthesis. To this end large concentrations of electrolyte are necessary, thereby making it necessary to add the electrolyte in solid form. This procedure is only of limited suitability for a continuous preparatory process.

Processes for obtaining cationic azo dyes have also been described in which mixtures of water and organic solvents are used. However, for environmental and economic reasons these processes make it necessary to recover the solvents—in some cases a complicated and expensive procedure.

There has now been found a process for the continuous preparation of cationic azo or hydrazone dyes which can be carried out without a solvent and which does not require the addition of solid electrolyte to precipitate the dyes. Surprisingly, in the process of this invention the dyes are obtained in better yield, the reaction time for the alkylation is shorter, and some of the dyes are obtained in greater purity.

Accordingly, the present invention provides a process for the preparation of cationic dyes by alkylation of an azo or hydrazone dye that does not carry an electric charge, wherein the alkylation is carried out continuously and the reaction mixture, after the alkylation, contains sufficient electrolyte that a two-phase system forms, said system consisting of an aqueous electrolyte solution which is substantially free from dye and a highly concentrated oily dyestuff phase or solid dye, and the dye is precipitated continuously from the two-phase system.

A preferred embodiment of the process of this invention comprises alkylating an azo dye of formula $$D-N=N-K \tag{1}$$

wherein D is the radical of a heterocyclic diazo component and K is the radical of a coupling component, or a hydrazone dye of formula

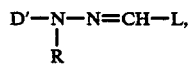 (2)

wherein D' is the radical of an aromatic diazo component, L is the radical of a methylene base of a N-heterocyclic compound, and R is hydrogen or alkyl.

The azo dye of formula (1) or the hydrazone dye of formula (2) can be synthesised in any manner. Preferably, however, they are prepared continuously by diazotisation and coupling and are then, without being isolated, continuously alkylated and precipitated.

A particularly preferred embodiment of the invention is accordingly a process for the continuous preparation of a cationic dye of formula

 (3), wherein D is the radical of a heterocyclic diazo component, K is the radical of a coupling component and An⊖ is an anion, or of a hydrazone dye of formula

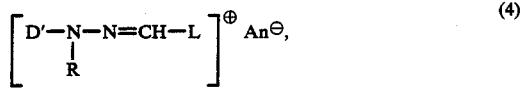 (4)

wherein D' is the radical of an aromatic diazo component, L is the radical of a methylene base of a N-heterocyclic compound, R is hydrogen or alkyl, and An⊖ is an anion, which process comprises diazotising an amine of formula $D-NH_2$ or $D'-NH_2$ in a mixture of water and acid, reacting the diazo solution so obtained with a coupling component KH or with a methylene base $L=CH_2$ to an azo or a hydrazone dye, and subsequently alkylating said dye with an alkylating agent, using sufficient acid in the diazotisation that a two-phase system forms after the alkylation, which system consists of an aqueous electrolyte solution which is substantially free from dye and a highly concentrated oily dye phase or solid dye.

A characteristic feature of the process of this invention is that, after the alkylation, the reaction mixture contains sufficient electrolyte for a two-phase system to form. If necessary, electrolyte can be added after the alkylation. However, it is preferred to add sufficient acid during the diazotisation that the said two-phase system forms after the alkylation without the addition of salt. The total amount of acid is preferably added at the start, together with the diazotisable amine; but it is also possible to add a portion of the acid during the reaction.

The acid employed in the process of this invention is an inorganic or organic acid, e.g. hydrochloric acid, sulfuric acid, phosphoric acid or a carboxylic acid such as formic acid, acetic acid or propionic acid. Preferred acids are hydrochloric acid, sulfuric acid, formic acid or acetic acid, with sulfuric acid being most preferred.

The requisite amount of acid can be readily determined from the amount of electrolyte necessary for the formation of the two phases. In general, sufficient acid will be used that, after the alkylation, the reaction mass contains 15 to 25% by weight, preferably 18 to 22% by weight, of electrolyte.

The diazotisation is preferably carried out adiabatically. The preferred temperature range is from −10° to +60° C., in particular from 0° to 10° C. The duration of the diazotisation depends on the nature of the amine and on the temperature, and is preferably from 0.1 to 10 minutes.

Suitable diazotising agents are all agents which are able to effect formation of nitrous acid in the reaction mixture, e.g. nitrites or nitrosyl compounds such as nitrosylsulfuric acid or nitrosyl halides. It is preferred to use nitrites, most preferably sodium nitrite.

The diazotisation takes place in a suitable mixing chamber, preferably in a static mixer. The reaction mixture is then reacted continuously with a coupling component or methylene base, preferably in a flow reactor. It is also possible to carry out diazotisation and coupling simultaneously, i.e. to effect diazotisation in the presence of a coupling component.

The reaction is carried out in the temperature range from 0° to 60° C., preferably from 20° to 60° C. and, most preferably, from 25° to 45° C. The reaction time depends, inter alia, on the nature of the diazo and coupling component or methylene base and is normally from about 0.1 to 20 minutes.

The coupling component or methylene base can be used in the form of a suspension, emulsion or solution, e.g. in water or glacial acetic acid, or also in undiluted form. The resultant solution or suspension of the azo or hydrazone dye is then fed continuously into another reactor, where it is neutralized and alkylated by adding a strong base and an alkylating agent.

It is preferred to use a reactor which has a number of sites, preferably from two to ten, for the addition of alkylating agent and the strong base, so permitting a procedure in which the pH is kept substantially constant during the alkylation reaction. The pH is preferably in the range from 4 to 13 and the temperature during the alkylation is in the range from about 25° to 80° C., preferably from 40° to 60° C.

Examples of suitable alkylating agents are esters such as dimethyl sulfate or diethyl sulfate, halogen compounds such as butyl bromide, or epoxides, e.g. ethylene oxide, propylene oxide or epichlorohydrin.

Suitable strong bases are, for example, sodium or potassium carbonate or, preferably, potassium hydroxide and, most preferably, sodium hydroxide.

After the alkylation, the reaction mixture is fed to a suitable vessel in which the separation of the two phases that form is effected. One phase consists of aqueous electrolyte solution that is substantially free from dye and may also contain residual impurities from the synthesis. The other phase consists of crystalline dye or, preferably, of highly concentrated dyestuff oil. The form of this second phase will depend on the kind of dye obtained, but can be influenced also by the reaction conditions, e.g. temperature, nature of the strong base employed, dye concentration or residence time.

If recognition of the phase interface of the two liquid phases proves difficult, it is possible to distinguish the phases during working up by appropriate measures, e.g. conductivity measurements.

Suitable diazo components for the preparation of the azo dyes by the process of this invention are heterocyclic diazotisable amines. These are preferably compounds whose amino group is attached to an aromatic 5-membered ring which contains at least one N-atom in the ring. Suitable compounds have e.g. the formula

D—NH₂ (5)

wherein D is the radical of a triazole, thiazole, pyrazole or thiadiazole. The radicals D may be substituted, e.g. by $C_1$–$C_4$alkyl, $C_1$–$C_4$alkoxy, cyclohexyl, phenyl, naphthyl, amino, alkanoylamino, alkylamino or dialkylamino, or may also contain fused rings. Examples of suitable compounds D-NH₂ are: 3-amino-1,2,4-triazole, 3,5-diamino-1,2,4-triazole, 3-amino-5-phenyl-1,2,4-triazole, 6-alkoxy-2-aminobenzothiazole, 2-amino-1,3,4-thiadiazole, 2-amino-5-alkylamino-1,3,4-thiadiazole, 5-amino-3-phenyl-1,2,4-thiadiazole, 2-aminobenzothiazole, 5-amino-1,2,3-thiadiazole, 2-aminothiazol-1,3,6-acetylamino-2-aminobenzothiazole, 3-aminobenzopyrazole or 2-phenyl-3-aminopyrazole.

Especially preferred compounds D-NH₂ for the process of this invention are: 3-amino-1,2,4-triazole, 6-methoxy-2-amino-1,3-benzothiazole and 2-amino-5-diisopropylamino-1,3,4-thiadiazole. 3-Amino-1,2,4-triazole is most preferred.

The coupling component HK is a coupling component customarily used for obtaining cationic azo dyes. Particularly preferred coupling components are compounds of formula

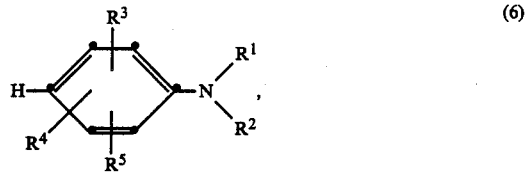

(6)

wherein
$R^1$ is hydrogen or unsubstituted or substituted alkyl or alkenyl,
$R^2$ is hydrogen or unsubstituted or substituted alkyl, alkenyl, cycloalkyl or phenyl, or
$R^1$ and $R^2$, together with the nitrogen atom to which they are attached, are a 5- or 6-membered heterocyclic ring which may contain one or two additional hetero atoms as ring members and/or may be substituted, or $R^1$ together with $R^3$ ortho to the amino group form a partially hydrogenated, unsubstituted or substituted 5- or 6-membered heterocyclic ring which may contain an additional N or O atom as ring member,
$R^3$ and $R^4$ are each independently of the other hydrogen, alkyl, alkoxy, alkanoylamino or halogen,
$R^5$ is hydrogen or together with $R^4$ in ortho-position forms the member which completes a fused benzene ring.

Possible substituents of radicals in the above formula which are defined as being substituted or unsubstituted are preferably nonionic substituents or carboxyl.

Nonionic substituents are in particular the customary non-dissociating substituents of dyestuff chemistry, e.g. cyano, hydroxy, halogen (e.g. fluorine, chlorine, bromine), nitro, alkyl, amino, alkylamino or dialkylamino, phenyl, alkoxy, acyl, acyloxy, alkoxycarbonyl or alkoxycarbonyloxy. Acyl denotes preferably alkylcarbonyl (akanoyl), unsubstituted or substituted benzoyl (substituents as for phenyl), alkylsulfonyl, phenylsulfonyl, alkylcarbamoyl or dialkylcarbamoyl, benzylcarbamoyl or dialkylsulfamoyl, with alkylcarbonyl (alkanoyl) being most preferred.

Preferred substituents of alkyl radicals $R^1$ or $R^2$ are: hydroxy, halogen (e.g. F, Cl, Br), cyano, alkoxy, carboxy, aminocarbonyl, carbalkoxy, acyl, acyloxy (preferred meanings of acyl are those indicated above, especially alkylcarbonyl), phenyl, phenoxy or benzyloxy. The same substituents are also suitable for cycloalkyl radicals, preferably alkyl, alkoxy, halogen or cyano.

Preferred substituents of phenyl radicals $R^2$ are: cyano, hydroxy, halogen (e.g. F, Cl, Br), alkyl, alkoxy, alkoxycarbonyl, carboxyl, carbamoyl, nitro, sulfamoyl, alkylcarbamoyl or benzoylamino. The respective phenyl radicals may carry for example 1 to 3, preferably 1 or 2, of these substituents.

Unless otherwise specified, in the above substituents and throughout the entire remainder of this specification, alkyl by itself or as moeity of composite substituents (e.g. alkoxy, alkoxycarbonyl, dialkylamino and the like) contains preferably 1 to 8, most preferably 1 to 4, carbon atoms. Examples of suitable alkyl groups are methyl, ethyl, n- or isopropyl, n-, sec- or tert-butyl.

Preferred cycloalkyl groups are cyclopentyl and cyclohexyl. Halogen is for example chlorine, bromine or fluorine, with chlorine being preferred. Alkenyl groups contain e.g. 2 to 8, preferably 2 to 5, carbon atoms. Suitable substituents of these groups are for example those indicated for alkyl, but preferably they are unsubstituted.

$R^1$ and $R^2$, together with the nitrogen atom to which they are attached, may be a 5- or 6-membered, preferably saturated, heterocycle. In addition to the N atom, this heterocycle may contain 1 or 2 further hetero atoms, selected in particular from the group consisting of O, N and S, as ring members. Preferably it contains one further hetero atom, in particular N or O. The heterocycle may be substituted, e.g. by alkyl, hydroxyalkyl, cyanoalkyl or alkoxy. Examples of such heterocycles are: pyrrolidine, piperidine, morpholine, piperazine, N-methyl-, N-ethyl- or N-hydroxyethylpiperazine, oxazolidine, thiomorpholine and pyrazolidine, with the first four mentioned heterocycles being preferred.

The member completing a partially hydrogenated heterocyclic ring formed by $R^1$ and $R^3$, together with the nitrogen atom to which they are attached, results in the formation of a 5- or 6-membered heterocycle which is fused to the benzene ring and which contains 1 or 2 N atoms or one N atom and one O atom and at least one double bond. Such a heterocycle may also be substituted, for example by a member selected from alkyl, alkoxy, halogen and hydroxy, with alkyl being the preferred substituent. The number of alkyl groups may be 1 to 6, e.g. 1 to 5, most preferably 1 to 4 or 1 to 3. The most preferred alkyl groups are methyl groups.

For example, $R^1$ and $R^3$, together with the nitrogen atom to which they are attached and with the fused benzene ring, form a dihydroindole, tetrahydroquinoline, tetrahydroquinoxaline or tetrahydro-1,4-benzoxazine radical, each of which may be substituted by 1 to 5 $C_1-C_4$alkyl groups. The dihydroindole and tetrahydroquinoline radicals are preferred. The nitrogen atom is, of course, substituted by the radical $R^2$.

Compounds of formula (6) having a particularly interesting utility are those wherein each of $R^1$ and $R^2$ independently of the other is $C_1-C_4$alkyl, $C_1-C_4$hydroxyalkyl, $C_1-C_4$alkoxy-$C_1-C_4$alkyl, $C_1-C_5$cyanoalkyl, $C_1-C_4$haloalkyl or benzyl, or $R^1$ and $R^2$, together with the nitrogen atom to which they are attached, form a piperidine, morpholine or piperazine ring, or $R^1$ together with $R^3$ in orthoposition to the amino group and with the benzene ring form a tetrahydroquinoline radical which is unsubstituted or substituted by 1 to 4 $C_1-C_4$alkyl groups, preferably methyl groups, $R^3$ is hydrogen or together with $R^1$ forms the tetrahydroquinoline radical as just defined, $R^4$ is hydrogen, $C_1-C_4$alkyl, $C_1-C_4$alkoxy or halogen, with hydrogen being preferred, and $R^5$ is hydrogen. Among these compounds, those compounds are particularly preferred wherein each of $R^1$ and $R^2$ independently of the other is $C_1-C_4$alkyl, or $R^1$ together with $R^3$ in ortho-position to the amino group and with the fused benzene ring form a tetrahydroquinoline ring which is unsubstituted or substituted by 1 to 4 methyl groups, $R^3$ is hydrogen or together with $R^1$ is the tetrahydroquinoline radical as just defined, and each of $R^4$ and $R^5$ is hydrogen.

A further group of especially suitable coupling components comprises compounds of formula

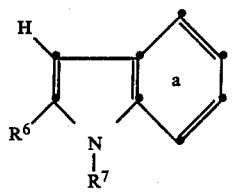

(7)

wherein
$R^6$ is methyl, ethyl or phenyl, and
$R^7$ is hydrogen, benzyl or unsubstituted or substituted alkyl, and the ring a is unsubstituted or substituted.

Suitable substituents of $R^7$ as alkyl are the groups cited above as substituents of the alkyl radicals $R^1$ and $R^2$. Suitable substituents of the ring a are e.g. $C_1-C_4$alkyl, $C_1-C_4$alkoxy, halogen such as bromine or, preferably, chlorine, cyano, acetylamino or $C_1-C_4$alkylsulfonyl. The ring a is preferably unsubstituted. In preferred compounds of formula (7), $R^6$ is methyl or phenyl, $R^7$ is hydrogen and the ring a is unsubstituted.

Suitable diazo components for the preparation of hydrazone dyes by the process of this invention are preferably compounds of formula $$D'-NH_2 \qquad (8)$$

wherein D' is the radical of an aromatic amine which is unsubstituted or substituted by alkoxy, nitro, halogen, hydroxyalkyl or hydroxyalkoxy.

The preferred diazo component is aniline or aniline which is substituted by $C_1-C_4$alkoxy, nitro, halogen, hydroxy-$C_1-C_4$alkyl or hydroxy-$C_1-C_4$alkoxy.

The methylene base employed is one known from the chemistry of hydrazone dyes, for example a benzimidazoline, indoline, pyrimidinone or benzoindoline which carries an active methylene group.

Particularly suitable methylene bases are 1,3-dimethyl-2-cyanomethylenebenzimidazoline, 1,3-dimethyl-2-carboxymethylenebenzimidazoline, 1,3-dimethyl-6-methylenepyrimidin-2-one, 1-ethyl-2-methylenebenzo(c,d)indoline or, preferably, 1,3,3-trimethyl-2-methyleneindoline.

The process of this invention affords the advantage of especially short reaction times, above all for the alkylation. The process is preferably carried out such that a maximum time of 90 minutes in the temperature range up to 50° C. is required for the total reaction comprising diazotisation, coupling, alkylation and precipitation.

In the process of this invention, the dyes are obtained either as crystalline compounds or as liquid, highly concentrated dyestuff oils and they can be readily further processed, in a manner known per se, to solid or liquid dye formulations.

When obtained as crystalline compounds, the dyes are e.g. washed and dried and, if necessary, auxiliaries such as diluents or dust inhibitors are added.

It is, however, preferred to carry out the process of the invention such that the dyes precipitate as an oil.

As the precipitated aqueous, highly concentrated dyestuff oil is usually lighter than the aqueous salt solution of low dye content, it can be isolated by simply allowing the heavier phase to drain off underneath. In the reverse case, the heavier phase which contains the dye is isolated by draining off.

Besides dye and water, the dyestuff oil obtained by the process of this invention contains only insignificant amounts of inorganic salts—at most 15% by weight and normally less than 10% by weight.

suspension is then fed to another stirred flow reactor in which the red cationic dye of formula

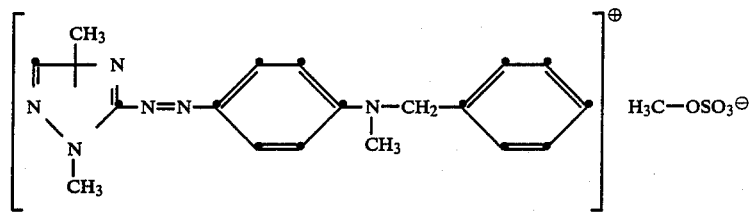

Preferred highly concentrated dyestuff oils of this invention contain (a) 30 to 90% by weight, preferably 50 to 80% by weight, of one or more salts of a cationic dye, (b) 55 to 8% by weight, preferably 45 to 15% by weight, of water, and (c) 1 to 15% by weight, preferably 2 to 8% by weight, of at least one inorganic salt or of an inorganic base.

The highly concentrated dyestuff oils of this invention are suitable for the preparation of solid and liquid dye formulations.

To prepare solid dye formulations, the crude dye is further processed in conventional manner by adding conventional assistants such as dust inhibitors, diluents and/or dispersants. These assistants, however, can also be added before drying the dye solution.

As the highly concentrated dyestuff oils of this invention have a fairly low salt content, they are also admirably suitable for preparing liquid dye formulations. The dyestuff oils may be diluted in known manner with water or organic solvent or a mixture thereof to the desired tinctorial strength. Suitable organic solvents are preferably those which are miscible with water in all proportions, for example monohydric and polyhydric alcohols such as glycols and glycol derivatives and, in particular, organic acids such as lower aliphatic carboxylic acids, preferably acetic acid. It is also useful to add further conventional auxiliaries of liquid dye formulations, for example amines such as alkanolamines and alkylamines as well as emulsifiers, to the liquid dye formulations. Low viscous, storage stable liquid dye formulations are obtained in this manner.

The phase remaining after separation of the dyes contains, in addition to inorganic salts and other residual impurities from the synthesis, only insignificant amounts of dye which can be readily decoloured e.g. with a small amount of hydrosulfite.

The use of the dyes is known. They are especially suitable for dyeing acid-modified synthetic fibers, preferably those made from polyacrylonitrile material or from fiber blends which contain such material.

In the following Examples parts and percentages are by weight.

EXAMPLE 1

An amine solution consisting of 1 part of 3-amino-1,2,4-triazole, 4.3 parts of 100% sulfuric acid and 12 parts of water is diazotised in 3 minutes at $-5°$ C., in a static mixer, with a solution of 0.8 part of sodium nitrite and 1.2 parts of water. The temperature rises to $+10°$ C. To the pale yellow diazo solution is added, in a stirred flow reactor, a solution of 2.3 parts of benzylmethyl aniline in 0.5 part of glacial acetic acid. The adiabatic coupling, over a residence time of 3 minutes, causes the temperature of the reaction mixture to rise to $30°$ C. The is formed by the addition of 4.8 parts of dimethyl sulfate while keeping the pH constant at 6–7 with 13.2 parts of 40% sodium hydroxide solution and cooling at $40°–45°$ C. The reaction mixture is fed into a static separating tank in which the separation of the highly concentrated dyestuff oil (6.9 parts) from the aqueous phase (32 parts) is effected. The yield from the entire synthesis is 83% of theory, based on aminotriazole. A liquid commercial formulation can be prepared direct by dilution with acetic acid and water.

EXAMPLE 2

An amine solution consisting of 1 part of 3-amino-1,2,4-triazole, 5.2 parts of 100% sulfuric acid and 11 parts of water is diazotised in 3 minutes at $-5°$ C., in a static mixer, with a solution of 0.8 part of sodium nitrite and 1.2 parts of water. The temperature rises to $+10°$ C. To the pale yellow diazo solution is added, in a stirred flow reactor, a solution of 1.77 parts of diethyl aniline. The adiabatic coupling, over a residence time of 3 minutes, causes the temperature of the reaction mixture to rise to $30°$ C. The suspension is then fed to another multi-compartment reactor in which the red cationic dye of formula

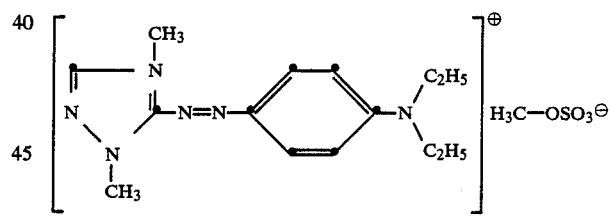

is formed by the addition of 4.8 parts of dimethyl sulfate while keeping the pH constant at 6–7 with 17.8 parts of 40% sodium hydroxide solution and cooling at $40°–45°$ C. The reaction mixture is fed into a static separating tank in which the separation of the highly concentrated dyestuff oil (7.8 parts) from the aqueous phase (37.5 parts) is effected. A liquid commercial formulation can be prepared direct by dilution with acetic acid and water.

EXAMPLE 3

A suspension of anisidine hydrosulfate consisting of 1 part of 1,4-anisidine, 1.1 parts of 92–94% sulfuric acid, 0.04 part of dispersant and 14.2 parts of water is diazotised at $25°$ C. in a static mixer with 1.4 parts of 40% sodium nitrite. The diazo solution is fed continuously to a stirred flow reactor and coupled with 1.4 parts of Fischer base. This reaction is carried out at a temperature of c. $45°$ C., while neutralising to a pH of 4–6 with 0.97 part of 40% sodium hydroxide solution.

In a cascade of 3 stirred flow reactors, alkylation is effected with 7 parts of dimethyl sulfate at 35° C. with pH contol. Until the conversion is c. 60%, the pH is 4-5 and thereafter at 7-8. After 1 hour at pH 7-8 and consumption of 3.14 parts of 40% sodium hydroxide solution, the methyl sulfate of the cationic dye precipitates in crystalline form. The product is isolated and dried (3.2 parts) or, after isolation at pH 12, worked up via the carbinol form to give the chloride or acetate. The yield over the entire synthesis up to the dye chloride is c. 93% of theory, based on anisidine.

The resultant yellow dye has the formula

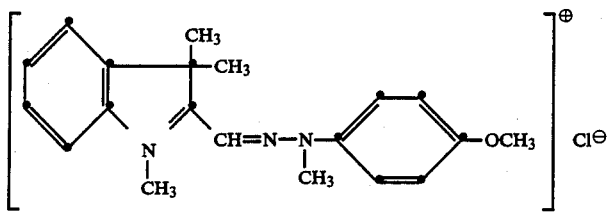

EXAMPLE 4

An amine solution consisting of 1 part of 3-amino-1,2,4-triazole, 5.2 parts of 100% sulfuric acid, 1.8 parts of diethyl aniline and 11 parts of water is diazotised continuously at a temperature of c. 25° C. in a stirred flow reactor with 2.1 parts of a 40% aqueous solution of sodium nitrite and simultaneoulsy coupled. Without isolation of the reaction product, the reaction mixture containing the azo dye is fed to a multi-compartment reactor and methylated therein continuously at c. 45° C. by addition of 4.8 parts of dimethyl sulfate. The pH is kept in the range from 6-7 during the methylation by addition of 40% aqueous sodium hydroxide solution. Further working up is effected as described in Example 2, to give the dye obtained therein in virtually the same quality and in the same yield.

EXAMPLE 5

A suspension consisting of 5.5 parts of 1,4-anisidine, 6 parts of 100% acetic acid, 0.2 part of dispersant, 7.7 parts of Fischer base and 88 parts of water is diazotised continuously at a temperature of c. 50° C. in a stirred flow reactor with 7.7 parts of a 40% aqueous sodium nitrite solution and simultaneously coupled. Without isolating the product, the reaction mixture containing the hydrazone dye is fed to another multi-compartment reactor and methylated therein continuously at c. 50° C. by addition of 40 parts of dimethyl sulfate. The pH is kept in the range from 7 to 13 by addition of aqueous sodium hydroxide solution. Further working up is effected as described in Example 3, to give the dye obtained therein in virtually the same quality and the same yielded.

EXAMPLE 6

A suspension consisting of 83 parts of 2-amino-5-diiso-propylamino-1,3,4-thiadiazole, 50 parts of N,N-dimethylaniline, 28.5 parts of sodium nitrite, 1 part of dispersant and 290 parts of water is mixed continuously at c. 20° C. with 52 parts of 40% sulfuric acid in a stirred flow reactor. Adiabatic simultaneous diazotisation and coupling takes place, to give a suspension which contains 128 parts of azo dye. Without isolation of this dye, the suspension is fed to another multi-compartment reactor and methylated therein continuously by addition of 170 parts of dimethyl sulfate, while keeping a pH of 4 by the addition of 40% sodium hydroxide solution. Then 40 parts of $ZnCl_2$ in 40 parts of water are added continuously to the reaction mixture, whereupon the cationic dye of formula

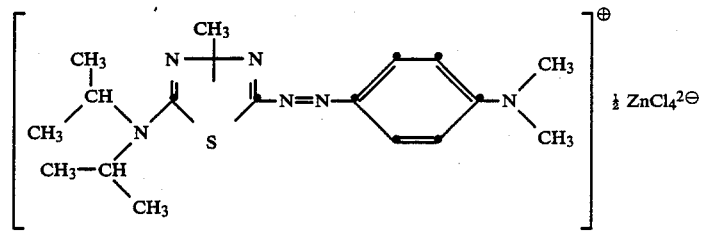

precipates. The dye is isolated and worked up in conventional manner.

What is claimed is:

1. A process for the preparation of a cationic dye by alkylation of an azo or hydrazone dye that does not carry an electric charge, wherein the alkylation is carried out continuously and the reaction mixture, after the alkylation, contains sufficient electrolyte that a two-phase system forms, said system consisting of an aqueous eectrolyte solution which is substantially free from dye and a highly concentrated oily dyestuff phase or solid dye, and the dye is precipitated continuously from the two-phase system.

2. A process according to claim 1, which comprises alklating an azo dye of formula

wherein D is the radical of a heterocyclic diazo component and K is the radical of a coupling component, or a hdrazone dye of formula

wherein D' is the radical of an aromatic diazo component, L is the radical of a methylene base of a N-heterocyclic compound, and R is hydrogen or alkyl.

3. A process according to claim 1, wherein the reaction conditions are so chosen that no addition of salt is necessary to precipitate the cationic dye.

4. a process according to claim 1, wherein the alkylation is carried out in a multi-compartment reactor that has 2 to 10 sites for adding an alkylating agent and a strong base.

5. A process accroding to claim 1, wherein the alkylation is carried out at a pH value in the range from 4 to 13.

6. A process according to claim 1, wherein the alkylation is carried out in the temperature range from 25° to 80° C.

7. A process according to claim 11, wherein dimethyl sulfate or diethyl sulfate is used as alkylating agent.

8. A process according to claim 11, wherein potassium hydorxide or sodium hydroxide is used as strong base.

9. A process acrroding to claim 1, wherein the dye is separated as a liquid oil after the alkylation.

10. A process according to claim 2, wherein D is the radical of a triazole, thiazole, pyrazole or thiadiazole, which radical is unsubstituted or substituted by $C_1$-$C_4$alkyl, $C_1$-$C_4$alkoxy, cyclohexyl, phenyl, naphthyl, amino, alkanoylamino, alkylamino or dialkylamino, and is not fused or is fused to form a benzene ring.

11. A process according to claim 10, wherein D is the radical of a diazo component selected from the group consisting of 3-amino-1,2,4-triazole, 3,5-diamino-1,2,4-triazole, 3-amino-5-phenyl-1,2,4-triazole, 6-alkoxy-2-aminobenzothiazole, 2-amino-1,3,4-thiadiazole, 2-amino-5-alkylamino-1,3,4-thiadiazole, 2-amino-5-dialkylamino-1,3,4-thiadiazole, 5-amino-3-phenyl-1,2,4-thiadiazole, 2-aminobenxothiazole, 5-amino-1,2,3-thiadiazole, 2-aminothiazole-1,3, 6-acetylamino-2-aminobenzothiazole, 3-aminobenxopyrazole or 2-phenyl-3-amino-pyrazole.

12. A process according to claim 11, wherein D is the radical of a diazo component selected from the group consisting of 3-amino-1,2,4-triazole, 6-methoxy-2-amino-1,3-benxothiazole and 2-amino-5-diisopropylamino-1,3,4-thiadiazole, 13. A process according to claim 2, wherein K is the radical of a coupling component HK, which is a compound of formula

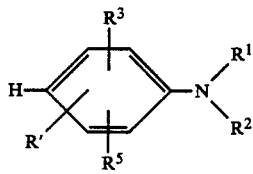

(6)

wherein
$R^1$ is hydrogen or $C_1$-$C_8$-alkyl or $C_2$-$C_8$alkenyl which are unsubstituted or substituted by carboxy, cyano, hydroxy, fluorine, chlorine, bromine, nitro, $C_1$-$C_8$alkyl, amino, $C_1$-$C_8$alkylamino, di($C_1$-$C_8$alkyl) amino, pehnyl, $C_1$-$C_8$alkoxy, $C_1$-$C_8$alkoxycarbonyl, $C_1$-$C_8$alkoxycarbonyloxy, $C_1$-$C_8$alkylcarbonyl, benzoyl, $C_1$-$C_8$alkysuslfonyl, phenylsulfonyl, $C_1$-$C_8$alkylcarbamoyl, di($C_1$-$C_8$alkyl) carbamoyl, benxylcarbamoyl or di($C_1$-$C_8$alkyl)sulfamoyl
$R^2$ is hydrogen or $C_1$-$C_8$alkyl, $C_2$-$C_8$alkenyl or $C_5$-$C_6$-cycloalkyl which are unsbustituted or substituted by cyano, hydroxy, fluorine, chlorine, bromine, nitro, $C_1$-$C_8$alkyl, amino, $C_1$-$C_8$alkylamino, di($C_1$-$C_8$alkyl)amino, phenyl, $C_1$-$C_8$alkoxy,$C_1$-$C_8$alkoxycarbonyl $C_1$-$C_8$alkoxycarbonyloxy, $C_1$-$C_8$alkylcarbonyl, benzoyl, $C_1$-$C_8$alkysulfonyl, phenylsulfonyl, $C_1$-$C_8$alkylcarbamoyl, di($C_1$-$C_8$alkyl)carbamoyl benzylcarbamoyl or di($C_1$-$C_8$alkyl)sulfamoyl, or phenyl which is unsubstituted or substituted by 1 to 3 radicals selected from cyano, hydroxy, fluorine, chlorine, bromine, nitro, $C_1$-$C_8$alkyl, $C_1$-$C_8$alkoxy, $C_1$-$C_8$aldkoxycarbonyl, carboxyl, sulfamoyl, $C_1$-$C_8$alkylcarbamoyl and benzoylamino, or $R^1$ and $R^2$, together with the nitrogen atom to which they are attached, are a 5- or 6-membered heterocyclic ring selected from pyrrolidine, piperidine, piperazine, N-methyl-, N-ethyl- or B-hydroxyethylpiperazine, oxazolidine, thiomorpholine and pyrazolidine, or $R^1$ together with $R^3$ ortho to the amino group form a dihydroindole, tetrahydroquinoline, tetrahydroquinoxaline, or tetrahydro-1,4-benzoxazine radical, each of which is unsubstituted or substituted by 1 to 5$C_1$-$C_4$alkyl groups, $R^3$ and $R^4$ are each independently of the other hydrogen, $C_1$-$C_8$-alkyl, $C_1$-$C_8$alkoxy, $C_1$-$C_8$alkanoylamino or fluorine, chlorine, or bromine, $R^5$ is hydrogen or together with $R^4$ in the ortho-position forms the member which completes a fused benzene ring.

14. A process according to claim 13, wherein each of $R^1$ and $R^2$ independently of the other is $C_1$-$C_4$alkyl, $C_1$-$C_4$hydroxyalkyl, $C_1$-$C_4$alkoxy-$C_1$-$C_4$alkyl, $C_1$-$C_5$-cyanoalkyl, $C_1$-$C_4$haloalkyl or benzyl, or $R^1$ and $R^2$, together with the nitrogen atom to which they are attached, form a piperidine, morpholine or piperazine ring, or $R^1$ together with $R^3$ in ortho-position to th amino group and with the fused benzene ring form a tetrahydroquinoline radical which is unsubstituted or substituted by 1 to 4 $C_1$-$C_4$alkyl groups, $R^3$ is hydrogen or together with $R^1$ forms the tetrahydroquinoline radical as just defined, $R^4$ is hydrogen, $C_1$-$C_4$alkyl, $C_1$-$C_4$alkoxy or fluorine, chlorine or bromine and $R^5$ is hydrogen.

15. A process according to claim 2, whrein K is the radical of a coupling component HR, which is a compound of formula

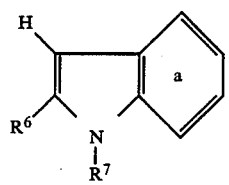

(7)

wherein
$R^6$ is methyl, ethyl or phenyl, and
$R^7$ is hydrogen, benzyl or unsubstituted $C_1$-$C_8$-alkyl, or $C_1$-$C_8$-alkyl substituted by carboxy, cyano, hydroxy, fluorine, chlorine, bromine, nitro, $C_1$-$C_8$alkyl, amino, $C_1$-$C_8$alkylamino, di($C_1$-$C_8$alkyl)amino, phenyl, $C_1$-$C_8$alkoxy, $C_1$-$C_8$alkoxycarbonyl $C_1$-$C_8$alkylcarbonyl, benzoyl, $C_1$-$C_8$alkylsulfonyl, phenylsulfonyl, $C_1$-$C_8$alkylcarbamoyl, di($C_1$-$C_8$alkyl)carbamoyl, benzylcarbamoyl or di($C_1$-$C_8$alkyl)sulfamoyl, and the ring a is unsubstituted or substituted by $C_1$-$C_4$alkyl, $C_1$-$C_8$alkoxy, bromine, chlorine, cyano, acetylamino or $C_1$–$C_8$alkylsulfonyl.

16. A process accroding to claim 2, wherein D' is the radical of an aromatic amine which is unsubtstituted or substituted by alkoxy, nitro, halogen, hydroxyalkyl or hydroxyalkoxy.

17. A process according to claim 16, wherein D' is aniline the radical or an aniline radical which is substituted by $C_1$–$C_4$alkoxy, nitro halogen, hydroxy-$C_1$–$C_4$alkyl or hydroxy-$C_1$–$C_4$alkoxy.

18. A process according to claim 2, wherein the methylene base L is a benximidazoline, an indoline, a pyrimidinone or a benzoindoline which carries an active methylene group.

19. A process according to claim 18, wherein the methylene base is a 1,3-dimethyl-2-cyanomethylenebenzimidazoline, 1,3-dimethyl-2-carboxymethylenebenzimidazoline, 1,3-dimethyl-6-methylenepyrimidine-2-one, 1-ethyl-2-methylenebonzo(c,d)indoline or, 1,3,2-trimethyl-2-methyleneindoline.

20. A process accroding to claim 14, wherein each of $R^1$ and $R^2$ independently of the other is $C_1$–$C_4$alkyl, or $R^1$ together with $R^3$ in ortho-position to the amino group and with the benzene ring form a tetrahydroquinoline ring which is unsubstituted or substituted by 1 to 4 methyl groups, $R^3$ is hydrogen or together with $R^1$ is the tetrahydroquinoline radical as just defined, and each of $R^4$ and $R^5$ is hydrogen.

* * * * *